(12) United States Patent
Ohara

(10) Patent No.: US 6,314,097 B1
(45) Date of Patent: *Nov. 6, 2001

(54) TRANSMISSION DEVICE

(75) Inventor: Katsuichi Ohara, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,064

(22) Filed: Aug. 11, 1997

(30) Foreign Application Priority Data

Jan. 27, 1997 (JP) ..................................................... 9-012691

(51) Int. Cl.⁷ ............................. H04J 3/12; H04Q 11/04
(52) U.S. Cl. .......................... 370/392; 370/395; 359/115
(58) Field of Search ..................................... 370/389, 392, 370/395, 400, 401, 465, 470, 471, 474, 503, 505, 506, 509, 514, 535; 359/115, 118, 135, 154, 158, 159; 375/362, 364, 369, 370, 371

(56) References Cited

U.S. PATENT DOCUMENTS

| | | | |
|---|---|---|---|
| 4,525,837 | * 6/1985 | Tan et al. | 370/389 |
| 5,315,594 | * 5/1994 | Noser | 370/353 |
| 5,325,354 | * 6/1994 | Hadano | 370/370 |
| 5,355,238 | * 10/1994 | Kight et al. | 359/135 |
| 5,365,518 | * 11/1994 | Noser | 370/395 |
| 5,461,608 | * 10/1995 | Yoshiyama | 370/228 |
| 5,568,486 | * 10/1996 | Huscroft et al. | 370/94.2 |
| 5,623,357 | * 4/1997 | Kight et al. | 359/135 |
| 5,754,545 | * 5/1998 | Shinbashi et al. | 370/360 |
| 5,781,527 | * 7/1998 | Read et al. | 370/216 |
| 5,905,585 | * 5/1999 | Shirai | 359/110 |
| 5,995,627 | * 11/1999 | Suh | 380/28 |

* cited by examiner

Primary Examiner—Alpus H. Hsu
(74) Attorney, Agent, or Firm—Rosenman & Colin LLP

(57) ABSTRACT

A transmission device to which transmission lines over which signals including overhead information are transferred, includes a first part which gathers and transfers the overhead information of the signals transferred over the transmission lines to a second part, and the second part which terminates the overhead information of the signals.

6 Claims, 16 Drawing Sheets

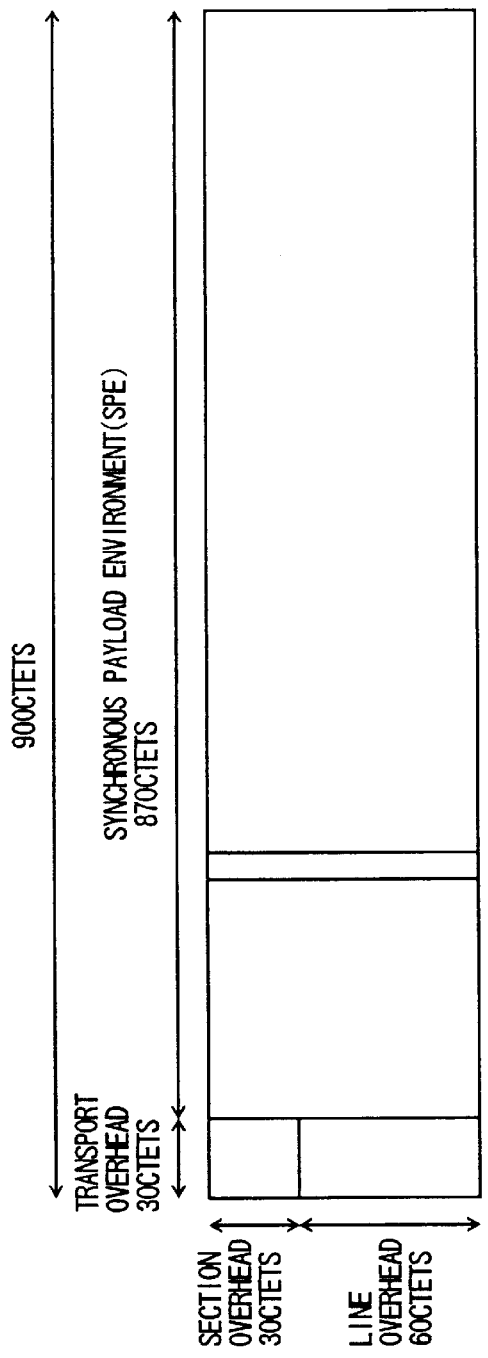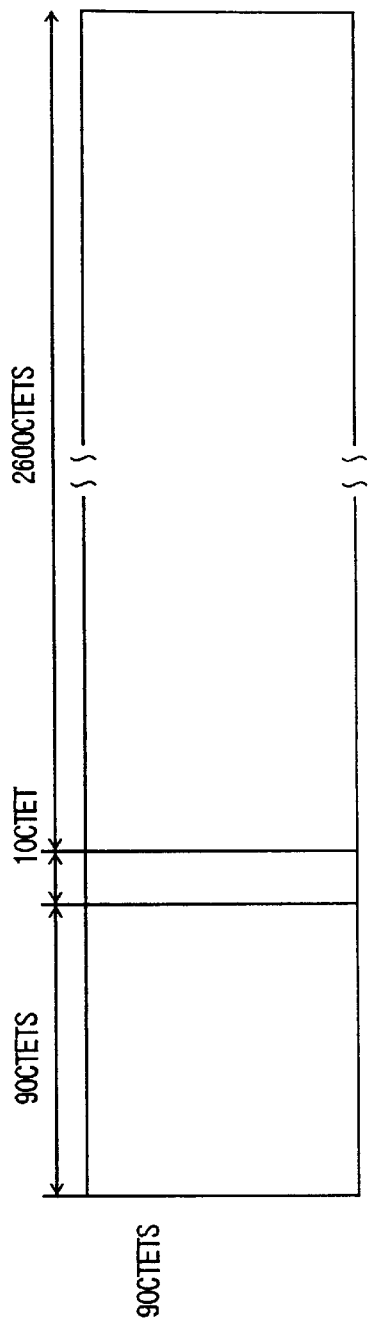

FIG. 3A PRIOR ART

| | | | |
|---|---|---|---|
| SECTION OVERHEAD | FRAMING A1 | FRAMING A2 | STS-ID C1 |
| | BIP-8 B1 | ORDERWITE E1 | USER F1 |
| | DATA COM D1 | DATA COM D2 | DATA COM D3 |
| LINE OVERHEAD | POINTER H1 | POINTER H2 | POINTER ACTION H3 |
| | BIP-8 B2 | APS K1 | APS K2 |
| | DATA COM D4 | DATA COM D5 | DATA COM D6 |
| | DATA COM D7 | DATA COM D8 | DATA COM D9 |
| | DATA COM D10 | DATA COM D11 | DATA COM D12 |
| | GROWTH Z1 | GROWTH Z2 | ORDERWITE E2 |

FIG. 3B PRIOR ART

| |
|---|
| TRACE J1 |
| BIP-8 B3 |
| SIGNAL LABEL C2 |
| PATH STATUS G1 |
| USER F2 |
| MULTIFRAME H4 |
| GROWTH Z3 |
| GROWTH Z4 |
| GROWTH Z5 |

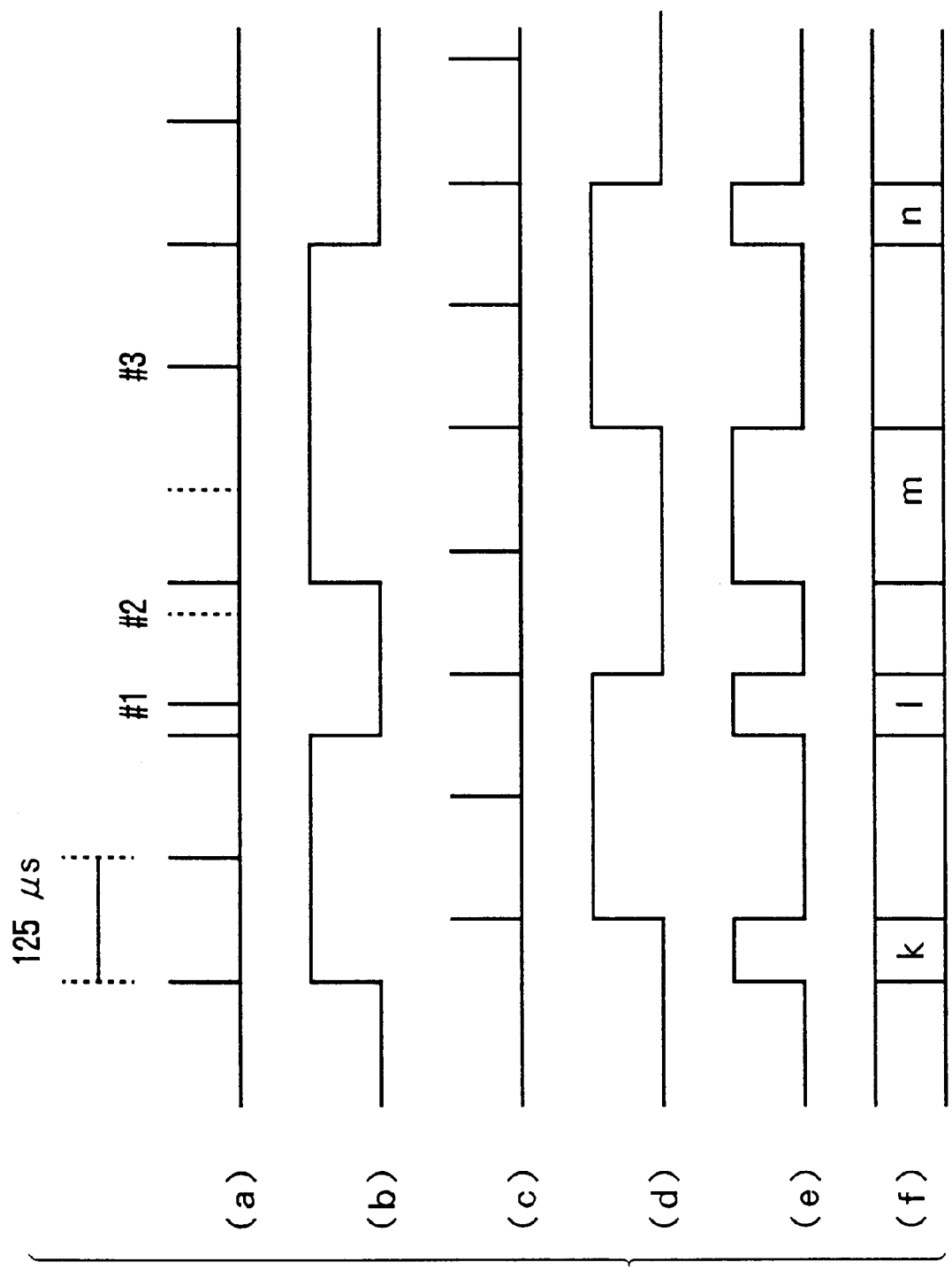
F I G. 16

TRANSMISSION DEVICE

BACKGROUND OF THE INVENTION

1. Field of the Invention

The present invention generally relates to an optical transmission device used in an optical communication network, and more particularly to an optical transmission device used in an optical communication network which employs a synchronous digital hierarchy.

An optical communication network has been practically used as means for providing broadband services in which a variety of data on telephone, facsimile, images and so on is integrated. The user/network interface in the optical communication network has been internationally standardized, and is known as a Synchronous Digital Hierarchy (SDH), as defined in the CCITT recommendations G707, G708 and G709, the disclosure of which is hereby incorporated by reference. A network which conforms to the SDH has been practically used as SONET (Synchronous Optical NETwork) in the North America.

2. Description of the Prior Art

First, a description will be briefly given of the SONET. The SONET is described in, for example, William Stallings, "ISDN and Broadband ISDN, Macmillan Publishing Company, 1992, pp. 546–558.

In the SONET, a multiplexed optical carrier (OC) is transmitted. The transmission device converts the optical signal (carrier) into an electric signal and vice versa. The electric signal is called a synchronous transport signal (STS). The basic bit rate of the SONET is 51.84 Mbps. The optical carrier having the above basic bit rate is expressed as OC-1. Generally, an optical carrier or signal is expressed as OC-N where N (optical carrier level N) is an integer, and a corresponding electric signal is expressed as STS-N (synchronous transport carrier level N). For example, the optical carrier OC-12 is an optical carrier or signal having a bit rate of 622.080 Mbps (=12×51.84 Mbps). In the SONET, signals having bit rates which are integer multiples of the basic bit rate. The optical carrier OC-12 is obtained by multiplexing 12 STS-1 signals at the byte level to thereby generate an STS-12 signal and by converting the STS-12 signal into an optical signal. Generally, the multiplexing of STS-N signals employs a byte-level interleave process.

It will be noted that the STS-3 in the SONET corresponds to a synchronous transport module STM-1 in the SDH. Similarly, the STS-12 corresponds to the STM-4.

The signal STS can be obtained by, for example, sequentially multiplexing digital signals having lower bit rates, such as DS-0 (64 Kbps), DS-1 (1.5 Mbps), DS-2 (6.3 Mbps) and DS-3 (45 Mbps).

FIG. 1 is a block diagram showing the outline of a network of the SONET. Electric signals from terminals 1 and 2 are respectively multiplexed by transmission devices 3 and 7, and resultant multiplexed signals are converted into light signals, which are then sent to transmission paths 8 formed of optical fiber cables. Repeaters 4, 5 and 6 are provided in the transmission paths 8. Particularly, the repeater 5 has a function of terminating the optical signals (the above function is called an add/drop function). As shown in FIG. 1, terms "section", "line" and "path" are defined in the SONET. The section corresponds to an optical transmission part between transmission devices, between repeaters or between a transmission device and a repeater. The line corresponds to an optical transmission part between transmission devices, between repeaters or between a transmission device and a repeater, each having the terminating function. The path indicates the end-to-end optical transmission part.

FIG. 2A is a diagram showing the frame format of the signal STS-1. As shown in FIG. 2A, the signal STS-1 consists of 810 octets, and is transferred every 125 μs. The 810 octets consists of nine rows arranged in a matrix formation, each of the rows consisting of 90 octets. In other words, the signal STS-1 has a 9×9 matrix formation. The first three columns (three octets×nine rows) forms an overhead in which a variety of control information concerning transmissions. The first three rows of the overhead forms a section overhead, and the remaining six rows forms a line overhead. The control information forming the overheads is also referred to as overhead information.

FIG. 2B is a diagram showing the frame format of the signal STS-3. In the SDH, a new format is not created during the hierarchically multiplexing operation. That is, the signal STS-3 can be formed by simply byte-multiplexing the signals STS-1 including the headers thereof without forming a new header specifically directed to the signal STS-3.

FIG. 3A shows the section overhead and the line overhead, and FIG. 3B shows the path overhead. The bytes forming these overheads are well known, and a description thereof will be omitted here.

FIG. 4 is a block diagram of an example of the SONET. The SONET shown in FIG. 4 includes transmission devices 10A, 10B, 10C and 10D, each of which has a higher bit rate of the bit rates of other transmission devices provided in the SONET. The transmission devices 10A–10D are coupled by means of optical fiber cables $11_1$ and $11_2$ in a dual loop (ring) formation. Transmission devices having bit rates equal to or lower than the transmission devices 10A–10D can be coupled to the transmission devices 10A–10D. For example, transmission devices 12a, 12b, 12c, 12d, . . . are connected to the transmission device 10A. The transmission device 10A multiplexes signals transmitted from the transmission devices 12a, 12b, 12c, 12d and so on via optical fiber cables 13a, 13b, 13c, 13d and so on. Then, the transmission device 10A sends a resultant multiplexed signal to either the transmission device 10B or 10D or both thereof. For the sake of convenience, the terms "east" and "west" can be used to describe the directions in which the signals are transferred. In FIG. 4, the transmission device 10D is located at the east side of the transmission device 10A, and the transmission device 10B is located at the west side thereof.

Although not shown in FIG. 4, transmission devices having bit rates lower than those of the transmission devices 12a, 12b, 12c and 12d are coupled thereto via optical fiber cables. That is, the system shown in FIG. 4 has a hierarchical structure in which signals from various terminals such as telephone sets, facsimile machines and personal computers are sequentially multiplexed in accordance with the given hierarchy, and the multiplexed light signals are transferred via the transmission devices 10A–10D. In practice, the transmission devices 10B and 10D may be repeaters (regenerators).

FIG. 5 is a block diagram of the transmission device 10A shown in FIG. 4. The transmission device 10A includes a plurality of line termination parts $21_1, 21_2, \ldots, 21_n$ (n is an arbitrary integer), a multiplexer/demultiplexer (MUX/DMUX) 22, a time slot assignment part 23 (hereinafter, simply referred to as a TSA part), a DCC relay/broadcast part 24 and a CPU 25. The working side optical carriers OC-N(W) of the line termination unit $21_1$ are connected to the optical fiber cables $11_1$ and $11_2$ in the east direction. The protection side optical carriers OC-N(P) of the lien termination unit $21_1$ are connected to the optical fiber cables 1 and $11_2$ in the west direction. The line termination part $21_2$ is connected to the optical fiber cable 13a (which is illustrated as a single line for the sake of convenience in FIG. 4). The optical fiber cables $11_1$ and $11_2$ carry, for example, the light signals OC-48, and the optical fiber cable 13a carries the light signal OC-12.

Each of the line termination parts $21_1$–$21_n$ is equipped with a line terminator 25w on the working line side, a line terminator 25p, and an overhead terminator 26. Each of the line terminators 25w and 25p has the function of terminating the overheads, that is, the function of adding the overheads to the signals to be transmitted and dropping the overhead from the received signals. More particularly, the line terminators 25w and 25p performs line termination processes which include an opto-electric/electro-optical conversion process, a scramble/descramble process, and an overhead add/drop process. The line terminators 25w and 25p output data (from which the overhead has been dropped) to the multiplexer/demultiplexer 22. The line terminator 25w and 25p add the overhead to data received from the multiplexer/demultiplexer 22. The overhead terminator 26 performs an overhead terminating process in which the overhead received from the line terminator 25w or 25p is segmented into byte-based data to thereby produce overhead bytes, and the overhead bytes are output to the line terminator 25w or 25p and are added to a signal to be transmitted.

The multiplexer/demultiplexer 22 has a demultiplexing function of demultiplexing the data received from the line termination parts $21_1$–$21_n$ into resultant signals STS-1, and a multiplexing function of multiplexing the signal STS-1 from the TSA part 23 to thereby produce the STS-N (corresponding to the light signal OC-N). For example, when the line termination part $21_1$ can process the signal STS-48, the multiplexer/demultiplexer 22 demultiplexes the signal STS-48 into 48 signals STS-1, and multiplexes 48 signals STS-1 into one signal STS-48.

The TSA part 23 performs a time slot assignment process in which the positions of the time slots of the signals STS-1 are assigned. For example, the TSA part 23 assigns the positions of the time slots of the 48 signals derived from the signal STS-48 to the line via which the data should be transmitted.

The DCC relay/broadcast part 24 extracts control data necessary to perform the relay/broadcast process from the overhead terminators 26 of the line termination parts $21_1$–$21_n$, and performs a given process for the extracted control data. The control data corresponds to data transmitted via data communication channels D1–D12 shown in FIG. 3. Hereinafter, the above control data will sometimes be referred to as DCC data. The data communication channels D1–D12 are used to transfer data between maintenance persons. More particularly, the data communication channels D1–D3 are used for a communication in the section, and the data communication channels D3–D12 are used for a communication in the line. The DCC relay/broadcast part 24 preforms a given relay/broadcast process when the DCC data from the optical fiber cable $11_1$ is relayed to some optical fiber cables or all of the optical fiber cables.

The above-mentioned parts shown in FIG. 5 are controlled by the CPU 25 connected thereto through a CPU bus 26.

FIG. 6 is a block diagram of the line terminators 25w and 25p. The following description assumes that the structure shown in FIG. 6 is the line terminator 25w. The line terminator 25w includes an opto-electric signal converter (O/E) 31, a descrambler (DSCR) 32, a framer circuit (frame synchronizing circuit) 33, an overhead byte drop part 34, a signal demultiplexer (DMUX) 35, an electro-optical signal converter (E/O) 36, a scrambler (SCR) 37, a frame pulse generator (PG) 38, an overhead byte add part 39, and a signal multiplexer (MUX) 40.

The opto-electric signal converter 31 converts a light signal received via an optical fiber cable (which is, for example, the east side optical fiber cable $11_1$) into an electric signal. The descrambler 32 descrambles the electric signal form the converter 31. The opto-electric signal converter 31 extracts a clock signal CLK from the converted electric signal, and sends the extracted clock signal CLK to the framer circuit 33. The framer circuit 33 produces a frame synchronizing signal from a descrambled signal (which is indicated as DATA in FIG. 6) and the clock signal CLK. The frame synchronizing signal indicates one frame, which corresponds to nine lines each consisting of 90 octets in the case of the signal STS-1. The frame synchronizing signal thus produced is applied to the overhead byte drop part 34 and the signal demultiplexer 35. The overhead byte drop part 34 separates the overhead and data from the above signal DATA. The overhead (DROPOHB) thus separated is output to the overhead terminator 26. The signal demultiplexer 35 demultiplexes, on the frame basis, the data supplied from the overhead byte drop part 34 in synchronism with the frame synchronizing signal. The dropped data is then output to the TSA part 22 via the multiplexer/demultiplexer 22. The above relates to a receive system of the line terminator 25w.

A transmit system of the line terminator 25w operates in synchronism with a master clock MCLK, which has the same frequency as that of the clock signal CLK extracted in the receive system. The frame pulse generator 38 generates a frame pulse from the master clock signal MCLK, and outputs the frame pulse to the overhead byte add part 39 and the signal multiplexer 40. The signal multiplexer 40 multiplexes data (ADD Data) received from the TSA part 22 via the multiplexer/demultiplexer 22 on the frame basis. The overhead byte add part 39 adds the overhead (ADD OHB) to the data multiplexed on the frame basis. In FIG. 6, the output signal of the overhead byte add part 39 is indicated as DATA. The descrambler 37 descrambles the signal DATA. The electro-optical signal converter 36 converts the scrambled signal from the scrambler 37 into a light signal, which is then output to the light fiber cable.

FIG. 7 is a block diagram of an internal structure of the overhead terminator 26 shown in FIG. 5. The overhead byte (DROP OHB) from the line terminator shown in FIG. 14 is processed by an input system, which is made up of a receive buffer (REC buf) 41, a receive frame pulse generator (RPG) 42, an overhead byte demultiplexer (DMUX) 43, an overhead byte receive register (INF-R) 44, and an overhead byte receive serial port (S-PORTR) 45. The overhead byte (ADD OHB) output to the line terminator is processed by an output system, which is made up of an overhead byte multiplexer 48, an overhead byte transmit register (INF-S) 49, and an overhead byte transmit serial port (S-PORTS) 50.

The overhead (DROP OHB) from the overhead terminator 26 is temporarily stored in the receive buffer 41, and is then applied to the overhead demultiplexer 43. The overhead demultiplexer 43 uses the frame pulse output by the receive frame pulse generator 42, and demultiplexes the received overhead on the byte basis. The overhead bytes thus demultiplexed are output to the receive register 44 and the receive serial port 45. The overhead bytes stored in the receive register 44 are required to be processed by the CPU 25 shown in FIG. 5. Examples of these overhead bytes are bytes K1 and K2, which forms an automatic protection switching (APS). The receive serial port 45 includes a plurality of serial ports, via which the overhead bytes (OHBR) other than those to be processed by the CPU 25 are output on the port basis. For example, the overhead bytes E1 and E2 for a speech communication are connected to a speech codec (not shown). The DCC data to be relayed or broadcasted is output to the DCC relay/broadcast part 24 via the receive serial port 45.

The overhead bytes transferred via the CPU bus 26 are temporarily stored in the transmit register 49 of the transmit system, and are then output to the overhead multiplexer 48. The overhead bytes (OHBS) from the serial ports (not shown) and the overhead bytes DCC from the DCC relay/broadcast part 24 are output to the overhead byte multiplexer 48 via the transmit serial port 50. The overhead byte multiplexer 48 multiplexes the received overhead bytes in accordance with a transmit frame pulse generated from the master clock MCLK by the transmit frame pulse generator 47. Then, the multiplexer 48 outputs the multiplexed overhead to the signal multiplexer 40 shown in FIG. 6 via the output buffer 46.

FIG. 8 is a block diagram of an internal structure of the DCC relay/broadcast part 24. The DCC data among the overhead bytes OHBR from the receive serial ports 45 of the overhead byte terminator 26 shown in FIG. 7 is applied, for each line, to a protocol terminator 53 via a receive buffer (REC buf) 51 in synchronism with the operation clock of the CPU 25 shown in FIG. 5. The protocol terminator 53 operates in synchronism with the CPU operation clock. The overhead bytes DCC output by the protocol terminator 53 is output to a transmit serial port 50 of each of the overhead bytes terminators 26 via an output buffer (OUT buf) 52. The protocol terminator 53 can be formed of a microprocessor or the like, and terminates the overhead bytes DCC. If the overhead bytes DCC includes information indicative of a request for repeat or broadcast, the protocol terminator 53 outputs the received overhead bytes DCC to the corresponding overhead byte terminator(s) 26 via the output buffer 52 (relay/broadcast process).

However, the above conventional transmission device has the following disadvantages.

The overheads are terminated by the overhead byte terminators 26 respectively provided in the line termination parts $21_1$ through $21_n$. Since the line termination parts $21_1$ through $21_n$ are respectively equipped with the overhead byte terminators 26, and have a large load and a large scale size.

The overhead bytes DCC necessary for the relay/broadcast are gathered in the DCC relay/broadcast part 24 and are then terminated. That is, the overheads are diassembled every byte, and the overhead bytes thus obtained are gathered in the DCC relay/broadcast part 24 for the relay/broadcast process. Hence, as an increased number of line termination parts is used, an increased number of signal lines used to gather the overhead bytes is needed and a more complex connection of the signal lines is required. Further, if an overhead byte to be relayed or broadcasted should be newly added, it is necessary to change the setting of the line termination parts $21_1$ through $21_n$ and the DCC relay/broadcast part 24. For example, new buffers should be provided in addition to the buffers 51 and 52 shown in FIG. 8, and the setting of the protocol terminator 53 should be changed.

SUMMARY OF THE INVENTION

It is a general object of the present invention to provide a transmission device in which the above disadvantages are eliminated.

A more specific object of the present invention is to provide a transmission device in which the line termination parts have reduced loads and thus the overhead bytes can be efficiently processed.

The above objects of the present invention are achieved by a transmission device to which transmission lines over which signals including overhead information are transferred, the transmission device comprising: a first part which gathers and transfers the overhead information of the signals transferred over the transmission lines to a second part; and the second part which terminates the overhead information of the signals. The first part corresponds to an ATM processing part 80 and an ATM relay/continuity protection part 64, which will be described later. The second part corresponds to an overhead processing part 65, which will be described later.

The transmission device may be configured so that the first part includes an asynchronous transfer system in which the overhead information of the signals are transferred to the second part in asynchronism with the signals transferred over the transmission lines.

The transmission device may be configured so that the second part comprises a third part which selects overheads which are included in the overhead information and are to be relayed or broadcasted to other transmission devices and which send the overheads back to the first part. The third part corresponds to a selector 131, which will be described later.

The transmission device may be configured so that the first part comprises: third parts respectively provided to the transmission lines, the third parts producing first cells including the overhead information dropped from the signals transferred via the transmission lines and adding the overhead information included in second cells to the signals to be transferred via the transmission lines; and a fourth part which transfers the first and second cells with the third parts. The third parts corresponds to the ATM processing part 80, and the fourth part corresponds to parts 91, 92 and 96, which will be described later.

The transmission device may be configured so that the fourth part comprises a fifth part which multiplexes the first cells to transmit multiplexed first cells to the second part and which demultiplexes multiplexed second cells into the second cells. The fourth part corresponds to a multiplexer/demultiplexer 94, which will be described later.

The transmission device may be configured so that the second part comprises a third part which converts data forming the overhead information terminated into continuous data. The third part corresponds to a DPLL circuit 133, which will be described later.

The transmission device may be configured the third part comprises: a memory which stores the overhead information supplied from the first part; and a digital PLL circuit comprising a counter generating a read clock applied to the memory from which the overhead information is read, and a controller which controls the counter in accordance with a frequency variation in the overhead information so that the frequency of the read clock is changed based on the frequency variation. The memory corresponds to an FIFO memory 207, which will be described later. The counter corresponds to an up/down counter 206, which will be described later, and the controller corresponds to parts 201–205, which will be described later.

The transmission device may be configured so that the first part transfers the overhead information of the signals transferred over the transmission lines to the second part in an asynchronous transfer mode.

The transmission device may be configured so that the first part transfers the overhead information of signals to the second part via an optical transmission path.

The transmission device may be configured so that the first part includes an asynchronous transfer system in which the overhead information of the signals is transferred in a multiplexed formation to the second part in asynchronism with the signals transferred over the transmission lines.

BRIEF DESCRIPTION OF THE DRAWINGS

Other objects, features and advantages of the present invention will become more apparent from the following detailed description when read in conjunction with the accompanying drawings, in which:

FIGS. 2A and 2B are diagrams showing the frame formats of signals STS-1 and STS-3;

FIG. 3A is a diagram of a section overhead and a line overhead;

FIG. 3B is a diagram of a line overhead;

FIG. 16 is a timing chart showing how to design the DPLL circuit shown in FIG. 15.

DETAILED DESCRIPTION OF THE PREFERRED EMBODIMENTS

Figure 9:
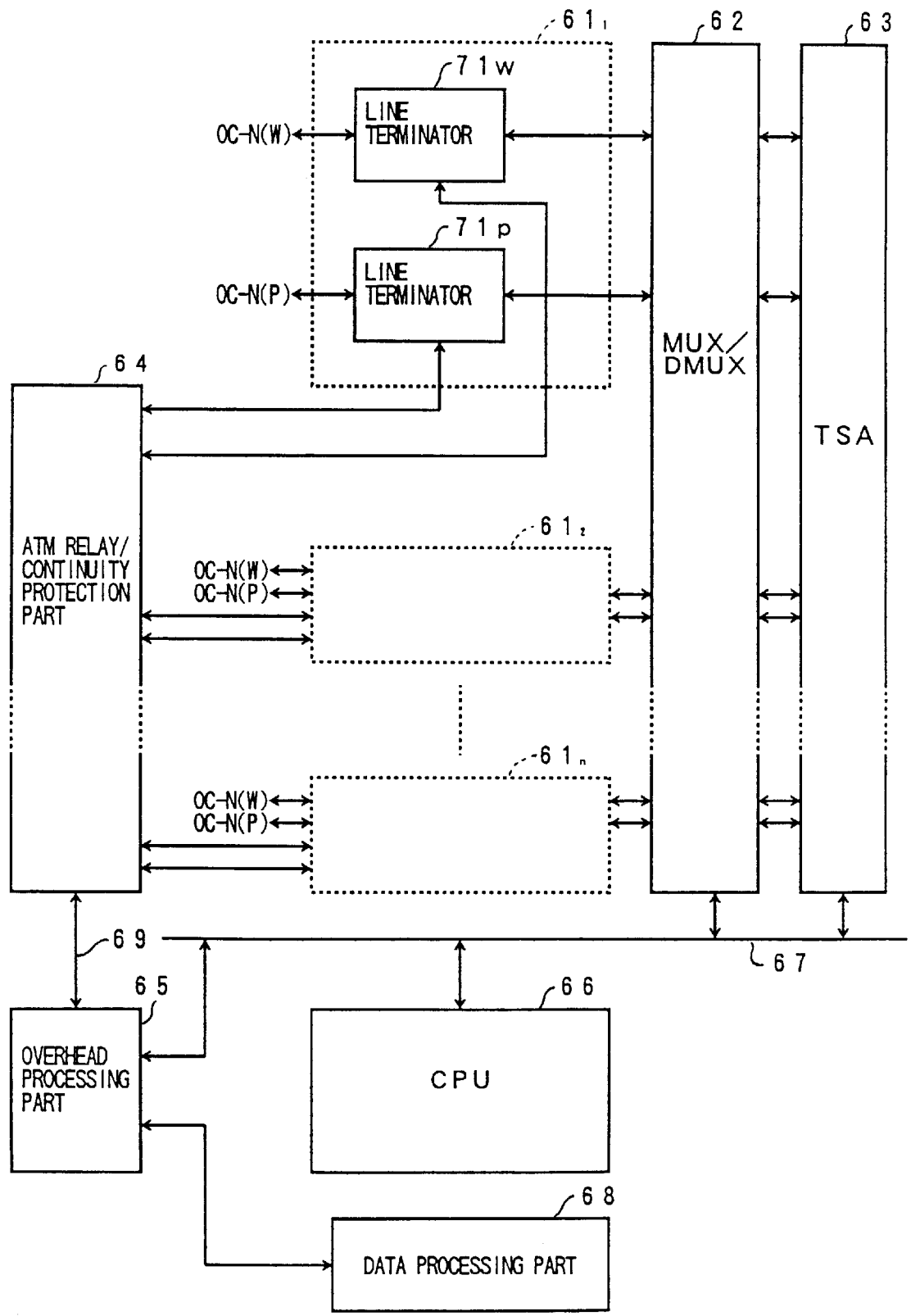
FIG. 9 is a block diagram of a transmission device according to an embodiment of the present invention.

FIG. 9 is a block diagram of a transmission device according to an embodiment of the present invention. The transmission device shown in FIG. 9 includes line termination parts $61_1$, $61_2$, . . . , $61_n$, a multiplexer/demultiplexer (MUX/DMUX) 62, a time slot assignment part (TSA) 63, an ATM relay/continuity protection part 64, and an overhead processing part 65. The overhead processing part 65 is connected to a CPU bus 67, to which a CPU 66 is connected. A data processing part 68 which processes DCC data is connected to the overhead processing part 65. As is well known, the term ATM is an abbreviation of Asynchronous Transfer Mode. The CPU 66 and the data processing part 68 shown in FIG. 9 can be provided inside of the transmission device or the outside thereof. As will be described later, the overhead processing part 65 is equipped with a plurality of ports (for example, a port for connection with a speech codec) other than a port via which the DCC data is output. However, these ports are omitted in FIG. 9 for the sake of simplicity.

In the transmission device shown in FIG. 9, each of the line termination parts $61_1$ through $61_n$ adds or drops the overhead every N bytes (N is an integer greater than 2. For example, the overhead is processed every tens of bytes. In other words, each of the line termination parts $61_1$–$61_n$ does not terminate the overhead every byte, but terminates the overhead every N bytes. The N bytes of the overhead are transferred between the part $61_1$–$61_n$ and the part 64.

For example, in the signal STS-1, the overhead consisting of 36 bytes included in one frame is dropped or added at one time. The ATM relay/continuity protection part 64 assembles the overheads from the line termination parts $61_1$–$61_n$ into an ATM cell, which is output to the overhead processing part 65 via an ATM transmission path 69 formed of an optical fiber cable. The overhead processing part 65 extracts the overhead bytes from the ATM cell and terminates the extracted overhead bytes. The overhead bytes required to be relayed or broadcasted are assembled into an ATM cell in the overhead processing part 65, and is sent back to the ATM relay/continuity protection part 64. The ATM relay/continuity protection part 64 extracts the overhead bytes to be relayed or broadcasted from the ATM cell, and outputs them to the corresponding line termination part or parts.

In the above manner, all the overheads in the lines including the overhead bytes to be relayed or broadcasted are processed by the overhead processing part 65. Hence, it is not necessary to provide the line termination parts $61_1$–$61_n$ with the respective overhead termination parts. As a result, it is possible to reduce the loads of the line termination parts $61_1$–$61_n$. Further, it is not necessary to gather the overhead bytes to be relayed or broadcasted separately from the other overhead bytes. In other words, the overhead bytes to be relayed or broadcasted can be processed in the same manner as the other overhead bytes. Thus, it is easy to add or delete an overhead byte, as necessary.

The transmission device shown in FIG. 9 employs the ATM transmission for the following reasons. The overheads of the transmission lines are asynchronous with each other. The ATM transmission is an asynchronous transmission, which is suitable for transmission of the asynchronous overheads. In the ATM transmission, the cells are merely sent to the ATM transmission paths, and it is thus not required to make the frequency of the ATM transmission paths equal to the frequency of the cells. Hence, there is no problem if the frequency of the ATM transmission paths is higher than the sum of the frequencies of the overheads to be transferred at a time. However, it should be noted that if there is a frequency difference between transmission lines, a jitter (frequency variation) occurs in the ATM cells. If the overhead bytes extracted from the ATM cell in the burst formation have a jitter, data obtained at each port will be not continuous data.

In order to absorb the frequency variation between the transmission lines and average the data outputting to form continuous data, a DPLL (Digital Phase-Locked Loop) circuit which will be described later is employed. It will be noted that the sequence of sending the ATM cells may cause a jitter. That is, there is not required that the ATM cells are present at fixed intervals, and thus the ATM cells are temporarily buffered and a jitter will occur if the ATM transmission paths are busy. However, the jitter caused in this case does not occur permanently, and has a large frequency variation. In order to ensure the continuity of data at each port, it is not necessary for the DPLL circuit to follow up the jitter. Thus, the DPLL circuit is required to respond to the above jitter. This will be described in detail later.

Figure 1:
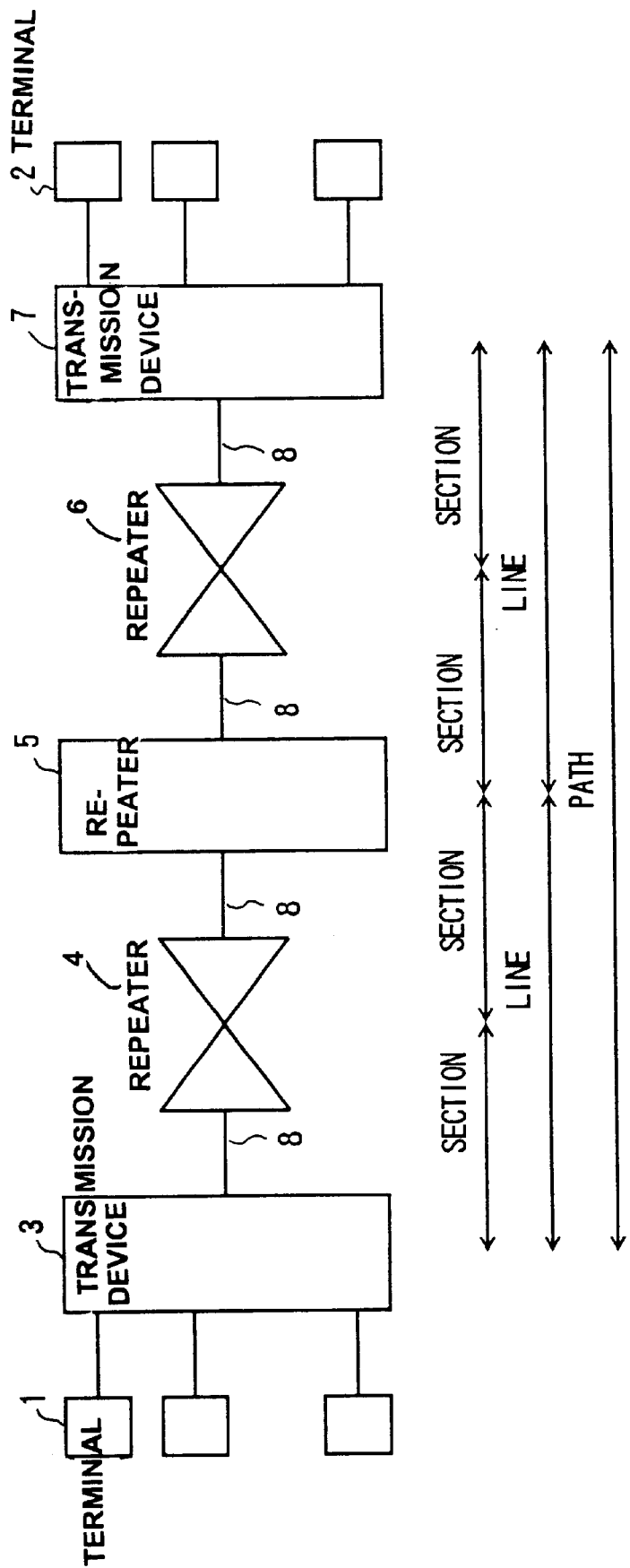
FIG. 1 is a block diagram showing the outline of the SONET.
Figure 4:
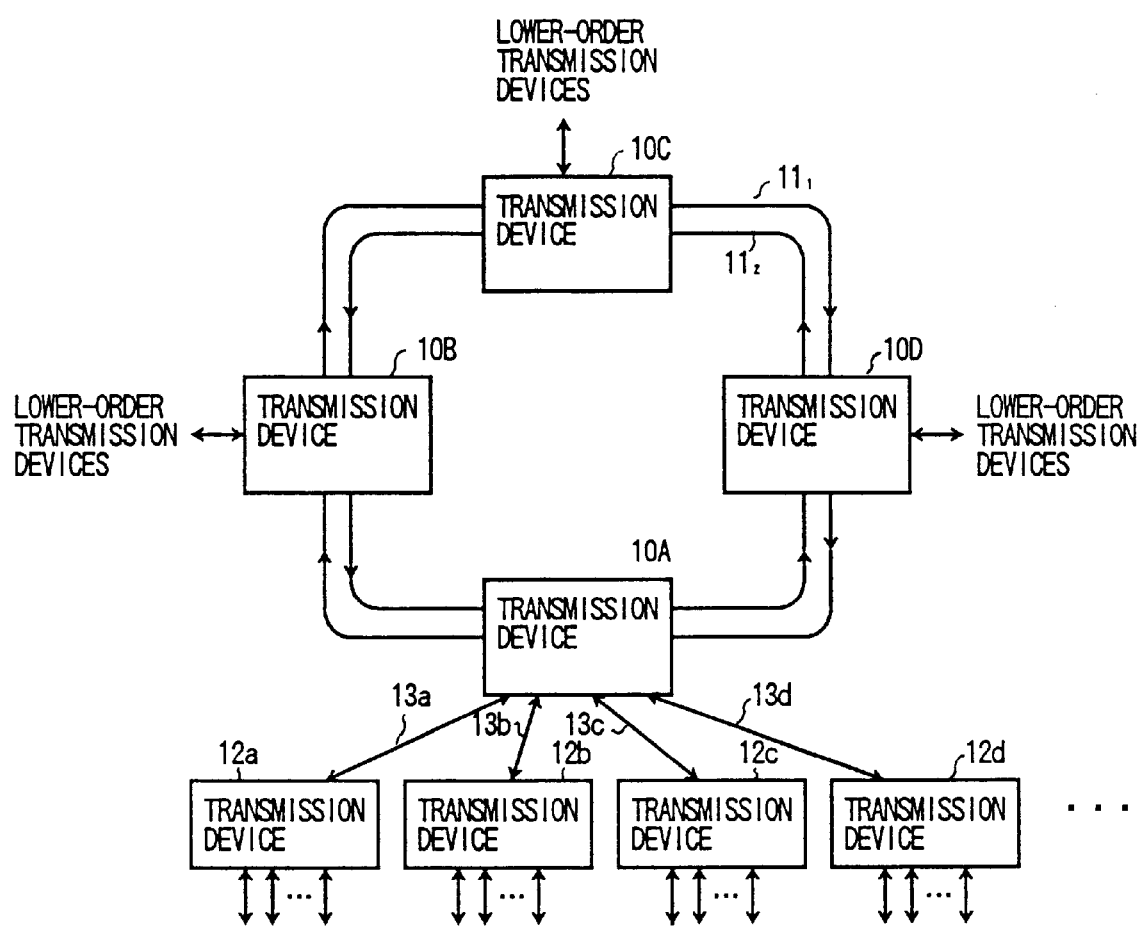
FIG. 4 is a block diagram of an example of the SONET.
Figure 5:
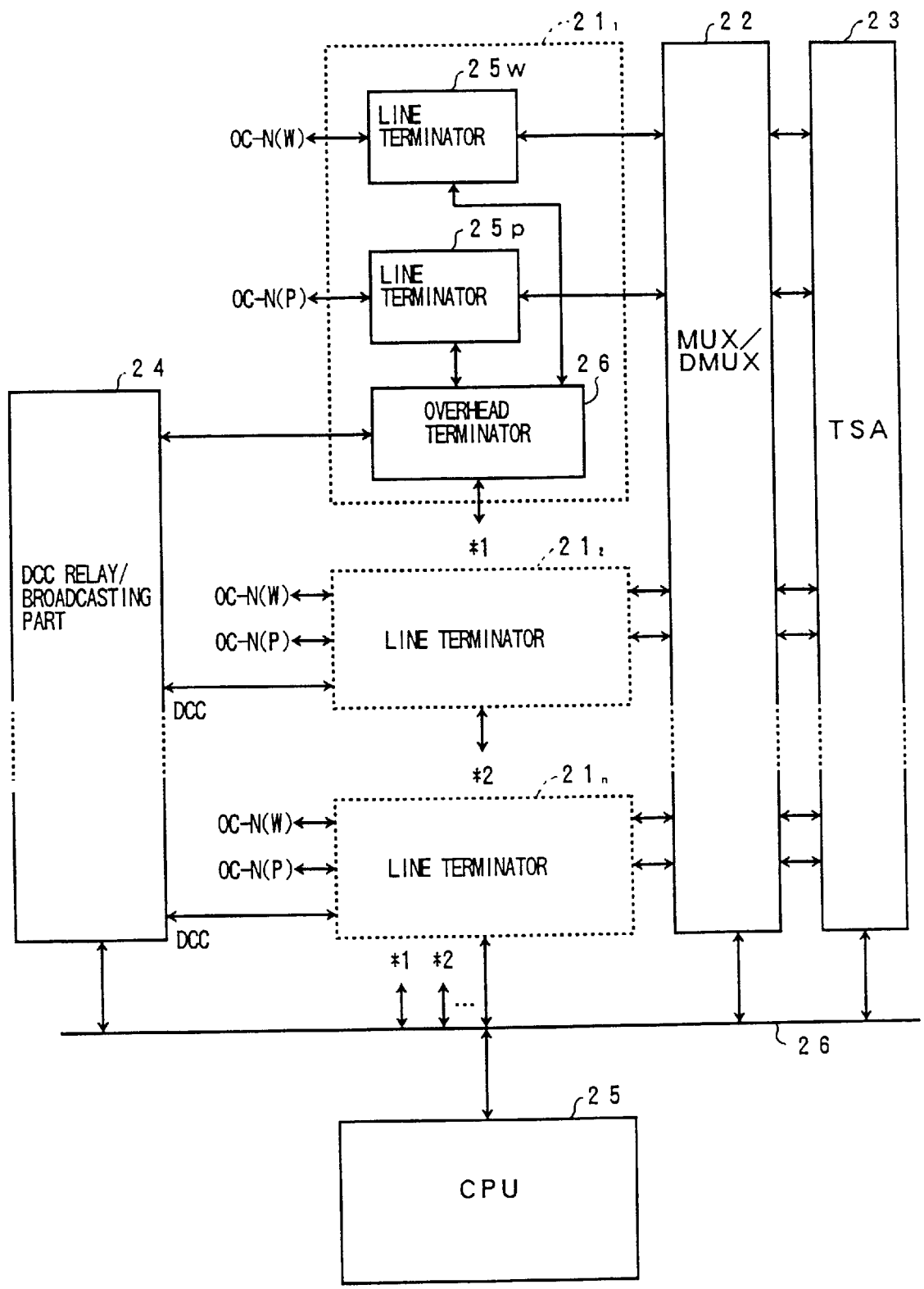
FIG. 5 is a block diagram of a transmission device 10A shown in FIG. 4.
Figures 6A, 6B:
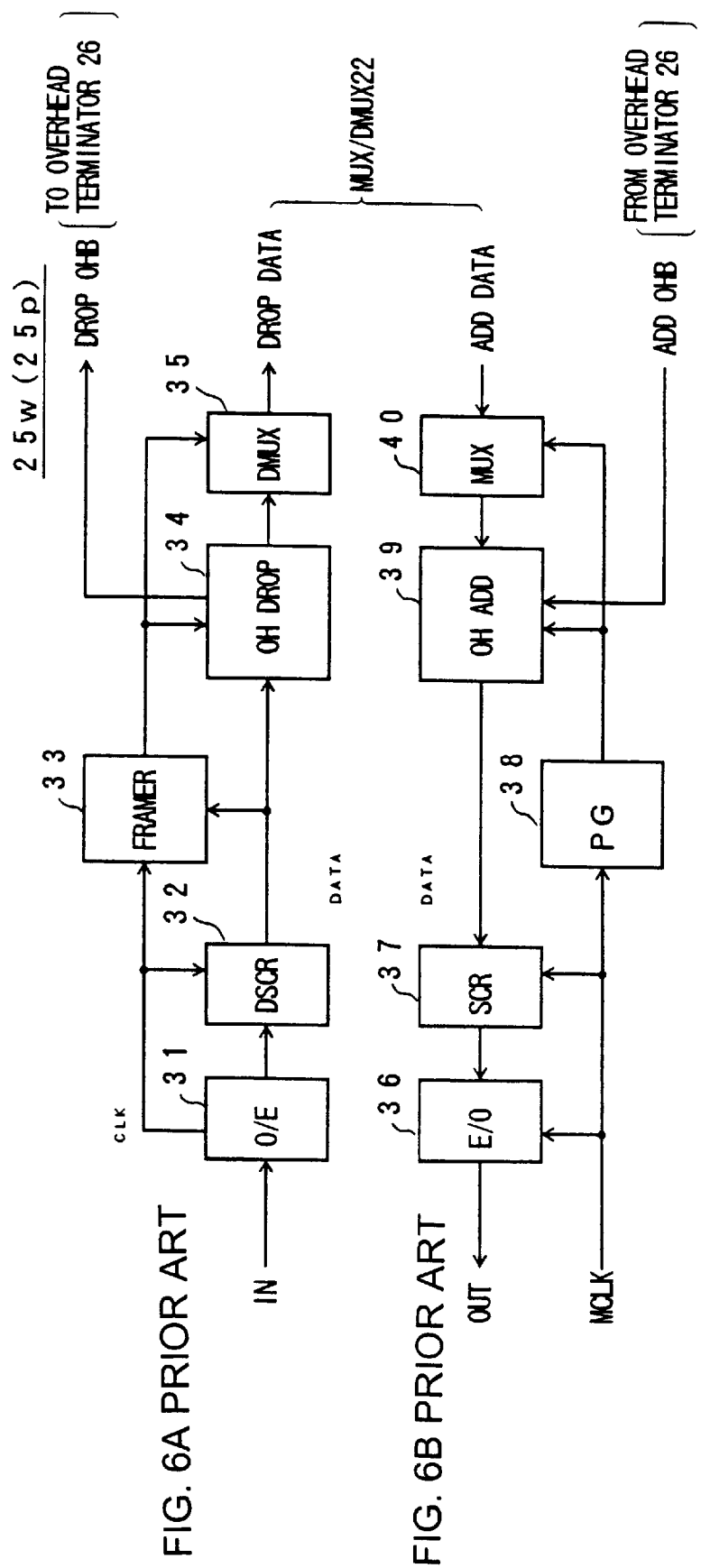
FIG. 6 is a block diagram of an internal structure of a line terminator shown in FIG. 5.
Figure 7:
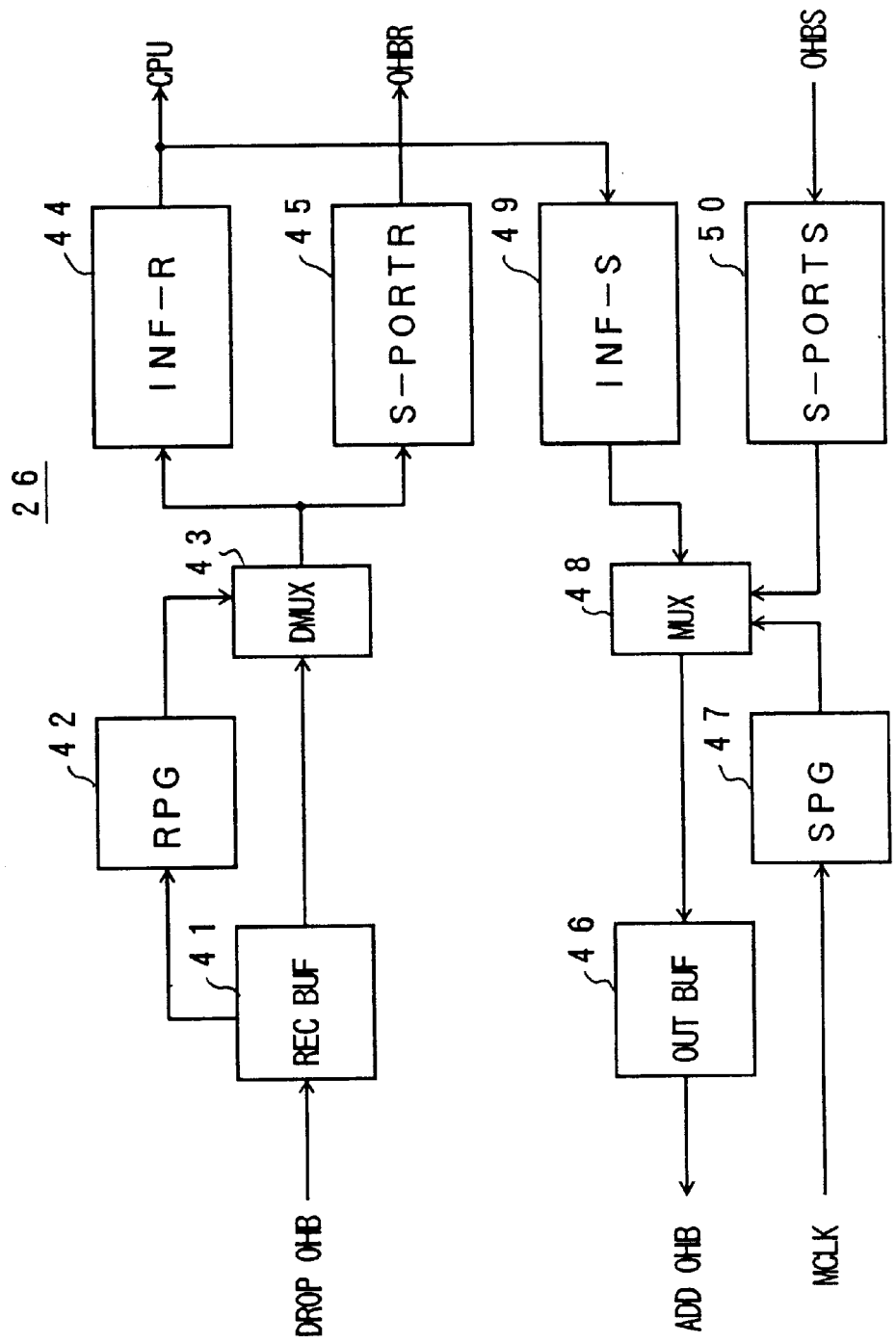
FIG. 7 is a block diagram of an overhead terminator shown in FIG. 5.
Figure 8:
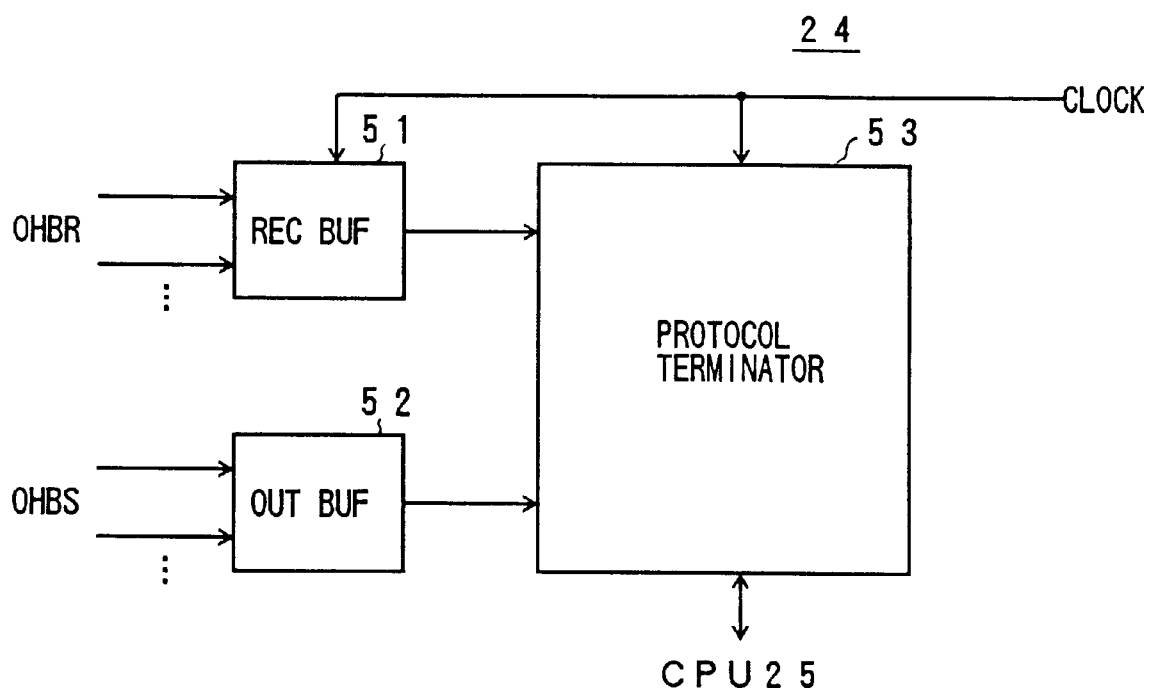
FIG. 8 is a block diagram of an internal structure of a DCC relay/broadcast part shown in FIG. 5.
Figure 10:
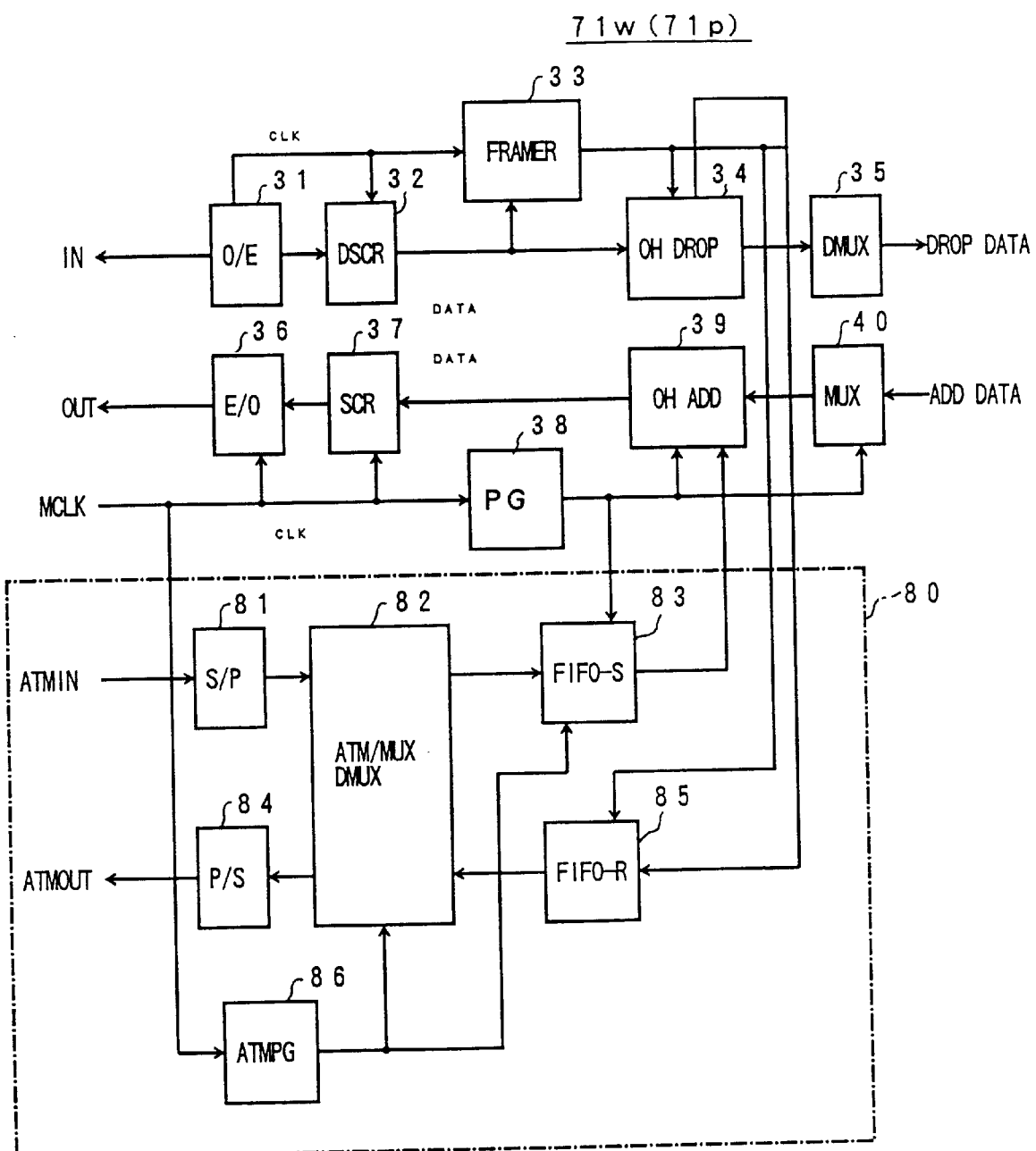
FIG. 10 is a block diagram of a line terminator shown in FIG. 9.

FIG. 10 is a block diagram of an internal structure of line termination parts 71w and 71p provided in each of the line termination parts $61_1$–$61_n$. In FIG. 10, parts that are the same as those shown in FIG. 6 are given the same reference numbers. The following description assumes that the structure shown in FIG. 10 is the line terminator 71w. The line terminator 71w is basically obtained by adding an ATM processing part 80 to the configuration shown in FIG. 6.

The ATM processing part 80 includes a serial-to-parallel converter (hereinafter, simply referred to as an S/P converter) 81, an ATM multiplexer/demultiplexer (MUX/DMUX) 82, a transmit data memory (FIFO-S) 83 formed of an FIFO memory, a parallel-to-serial converter (hereinafter, simply referred to as a P/S converter) 84, a receive data memory (FIFO-R) 85 formed of an FIFO memory, and an ATM frame pulse generator 86.

The overhead bytes extracted by the overhead byte drop part 34 are applied to the ATM multiplexer/demultiplexer 82 via the receive data memory part 85. The ATM multiplexer/demultiplexer 82 multiplexes the received overhead bytes so as to be assembled into the ATM cell consisting of 53 bytes. The assembling procedure of the ATM cell will be described later. The P/S converter 84 converts the multiplexed data into serial data, which is then output to the ATM relay/continuity protection part 64 (ATMOUT).

The multiplexed data received from the ATM relay/continuity protection part 64 is converted into parallel data by the S/P converter 81, the parallel data being output to the ATM multiplexer/demultiplexer 82. The ATM multiplexer/demultiplexer 82 extracts the overhead bytes from the received multiplexed data, the extracted overhead bytes being output to the overhead byte add part 39 via the transmit data memory 83. The ATM multiplexer/demultiplexer 82 and the transmit data memory 83 operate in synchronism with the frame pulse generated by the ATM frame pulse generator 86.

Figure 11:
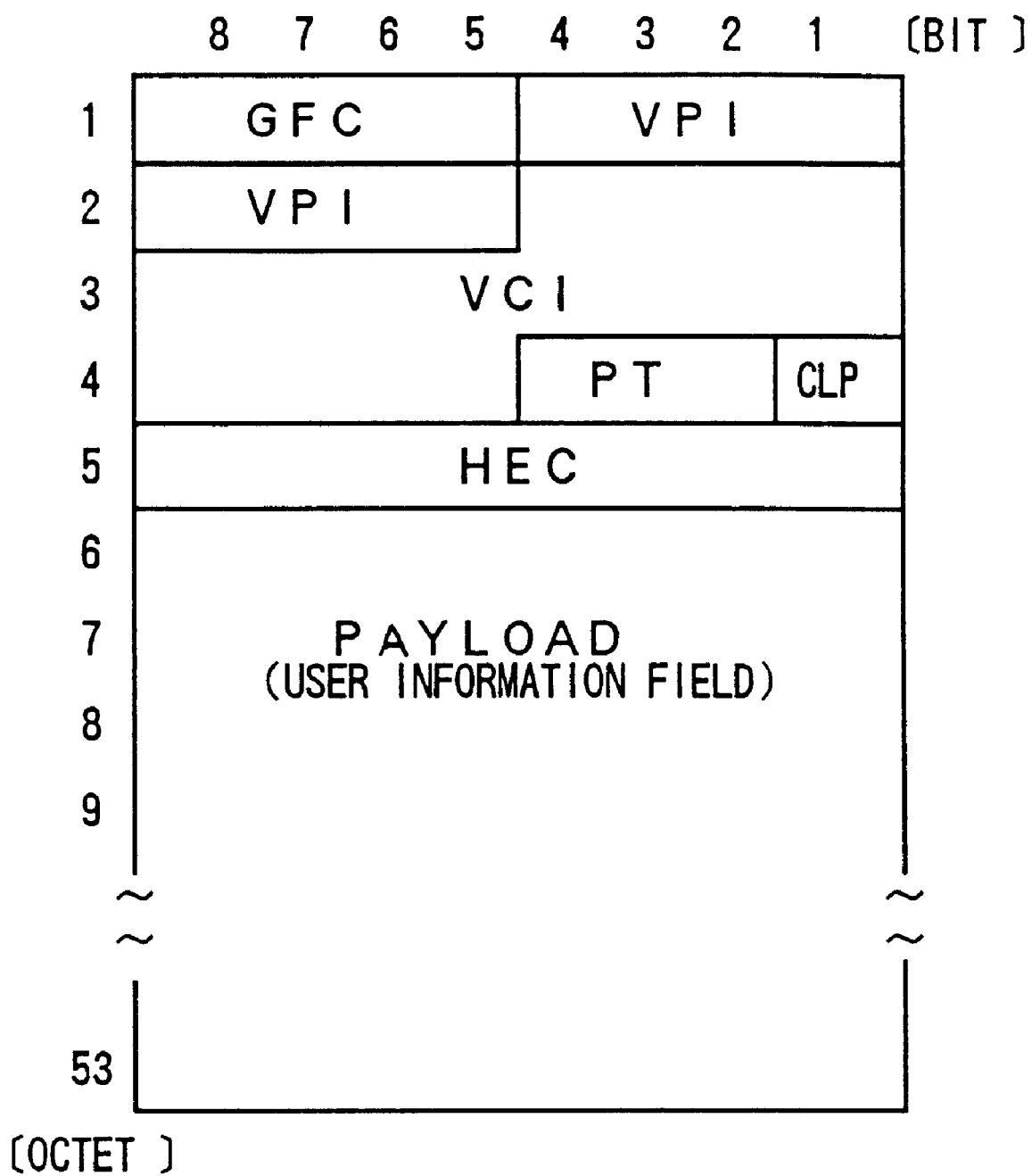
FIG. 11 is a diagram of the frame format of an ATM cell.

FIG. 11 is a diagram showing the frame format of the ATM cell. The ATM cell is a fixed-length cell, which consists of the header of 5 bytes, and a user information field (payload) of 48 bytes. The 5-byte header includes items of control information, GFC (Generic Flow Control), VPI (Virtual Path Identifier), VCI (Virtual Channel Identifier), PT (Payload Type), CLP (Cell Loss Priority), and HEC (Header Error Control). The format of the ATM cell shown in FIG. 11 is well known, and a detailed description thereof will be omitted here.

The ATM multiplexer/demultiplexer 82 allocates the overhead bytes separated by the overhead byte drop part 34 and stored in the receive data memory 85 to the user information field of the ATM cell.

Figure 12:
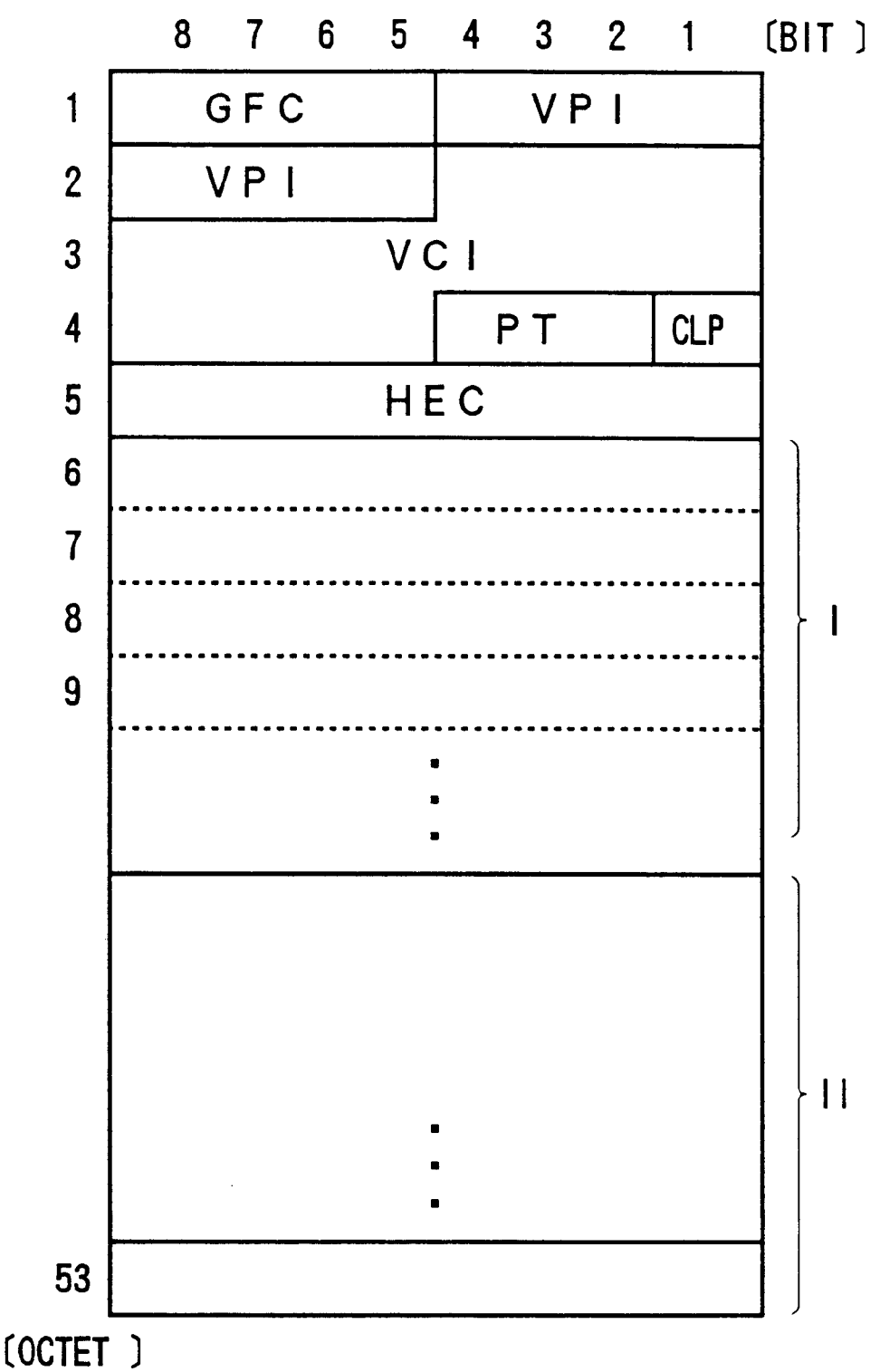
FIG. 12 is a diagram showing an allocation of overhead bytes to the ATM cell.

As shown in FIG. 12, the user information field is segmented into an area I and another area II. The area I is used to store the overhead bytes to be processed by the CPU 66. The area II is used to store the other overhead bytes. The positions in which the overhead bytes should be allocated are predetermined. For example, the bytes K1 and K2 of the control information APS to be processed by the CPU 66 are allocated to the sixth and seventh octets in the area I of the ATM cell. The overhead bytes D1–D12 forming the DCC data are allocated to 12 given bytes in the area II of the ATM cell. In the above manner, the positions in which the overhead bytes should be stored are predetermined, and thus desired overhead bytes can be easily extracted by using a counter or the like on the ATM cell receive side.

The ATM multiplexer/demultiplexer 82 sets specific data to the virtual channel identifier VCI. The specific data includes an ID of the involved line termination device, and data indicating to which channel of the STS-N the overhead being processed belongs. For example, the specific data indicates the channel among the 48 channels for the signal STS-48. Further, the ATM cell multiplexer/demultiplexer 82 sets other header information.

The ATM multiplexer/demultiplexer 82 extracts the overhead bytes from the ATM cell received via the S/P converter 81, and outputs the extracted overhead bytes to the transmit data memory 83.

Figure 13:
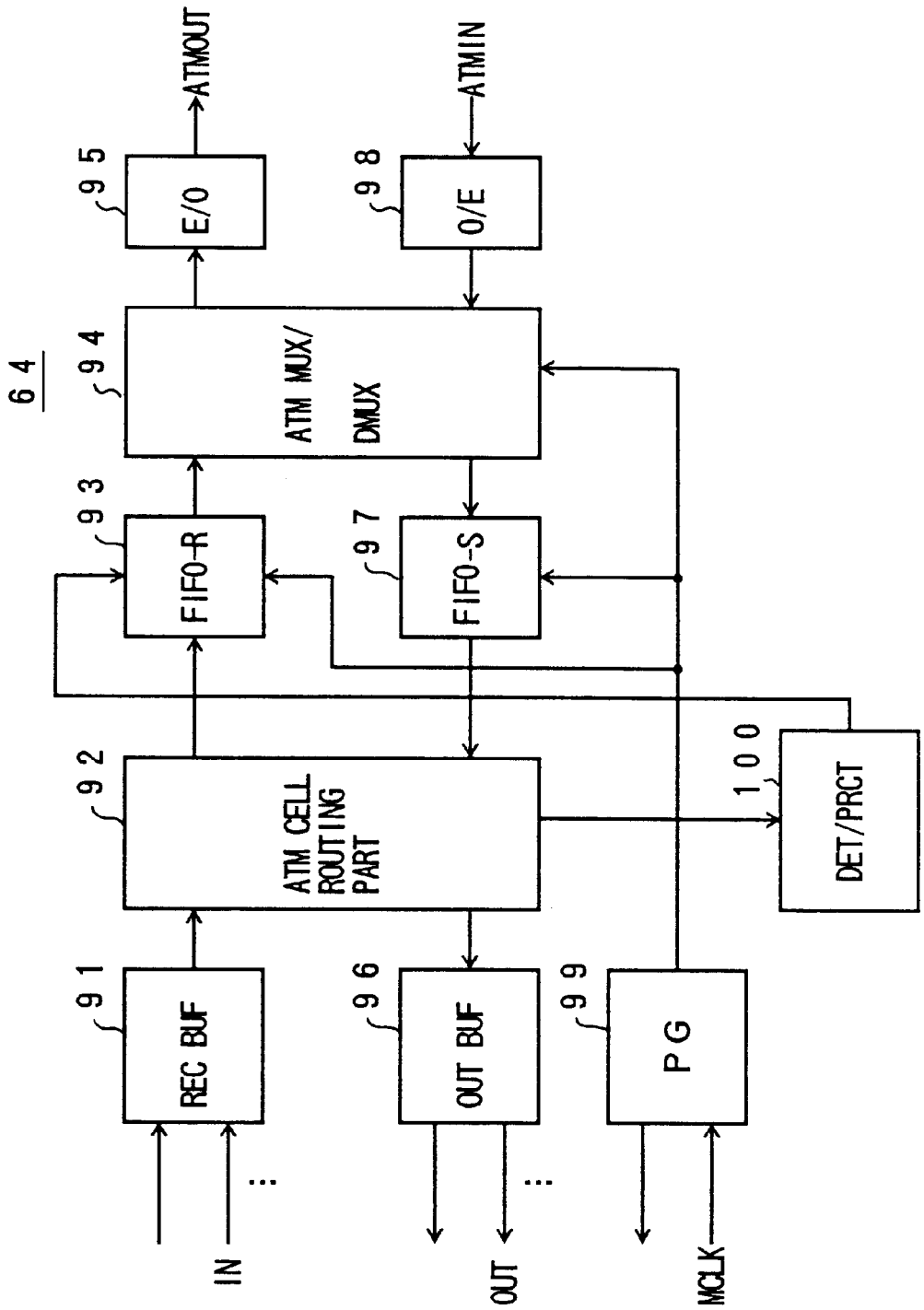
FIG. 13 is a block diagram of an ATM relay/continuity protection part shown in FIG. 9.

FIG. 13 is a block diagram of an internal structure of the ATM relay/continuity protection part 64 shown in FIG. 9. As shown in FIG. 13, the ATM relay/continuity protection part 64 is equipped with a receive buffer (REC buf) 91, an ATM cell routing part 92, a receive memory (FIFO-R) 93 formed of an FIFO memory, an ATM multiplexer/demultiplexer (ATM MUX/DMUX) 94, an electro-optical signal converter (E/O) 95, a transmit buffer (OUT buf) 96, a receive memory (FIFO-S) 97 formed of an FIFO memory, an optic-electric signal converter (O/E) 98, a frame pulse generator (PG) 99, and a continuity detection/protection part (DET/PRCT) 100.

Each of the line termination parts $61_1$–$61_n$ extracts tens of overhead bytes at one time, which are then supplied to the ATM cell routing part 92 via the respective receive buffers 91. The ATM cell routing part 92 performs a given ATM cell routing process for the ATM cells received via the receive buffer 91. As has been described previously, the ATM cells are connected to the overhead processing part 65 via the ATM transmission path 69. Hence, the routing process for the ATM cells received via the receive buffer 91 substantially causes these ATM cells to pass through the ATM cell routing part 92. Then, the ATM cells are temporarily stored in the receive memory 93. The continuity/protection part 100 monitors the overhead bytes which are stored in the ATM cells in the ATM cell routing part 92 and are to be processed by the CPU 66, and controls the overhead bytes so that a continuity of the overhead bytes over a plurality of ATM cells can be ensured. For example, the part 100 checks whether the overhead bytes have an error. If an error is present in an overhead byte, this defective overhead byte is prevented from being output and instead the immediately previous overhead byte having no error is output. The part 100 modifies the defective ATM cell so that it has the immediately previous overhead byte, and outputs the modified ATM cell to the receive buffer 93.

In the above manner, the receive buffer 93 temporarily stores the ATM cells from the parts 92 and 100, and outputs these ATM cells to the ATM multiplexer/demultiplexer 94.

The ATM multiplexer/demultiplexer 94 multiplexes the ATM cells received from the receive memory 93, and outputs multiplexed ATM cells to the electro-optical signal converter 95. The multiplexed ATM cells are converted into a light signal ATMOUT, which is then output to the ATM transmission path 69.

A light signal ATMIN received via the ATM transmission path 69 is converted into an electric signal by the opto-electric signal converter 98. Then, the electric signal is demultiplexed into ATM cells, which are temporarily stored in the transmit memory 97 and are then applied to the ATM cell routing part 92. The part 92 extracts the overhead bytes from the ATM cells, and refers to the values of the virtual channel identifiers VCI of the ATM cells corresponding to the respective line termination parts $61_1$–$61_n$. Then, the part outputs the overhead bytes to the corresponding internal buffers of the output buffer 96 respectively provided to the line termination parts $61_1$–$61_n$ in accordance with the values of the virtual channel identifiers VCI of the ATM cells.

The frame pulse generator 99 generates the frame pulse from the master clock MCLK, and outputs the frame pulse to the receive buffer 93, the ATM multiplexer/demultiplexer 94 and the transmit buffer 97. The frame pulse indicates one frame. The above parts 93, 94 and 97 operate on the frame basis.

Figure 14:
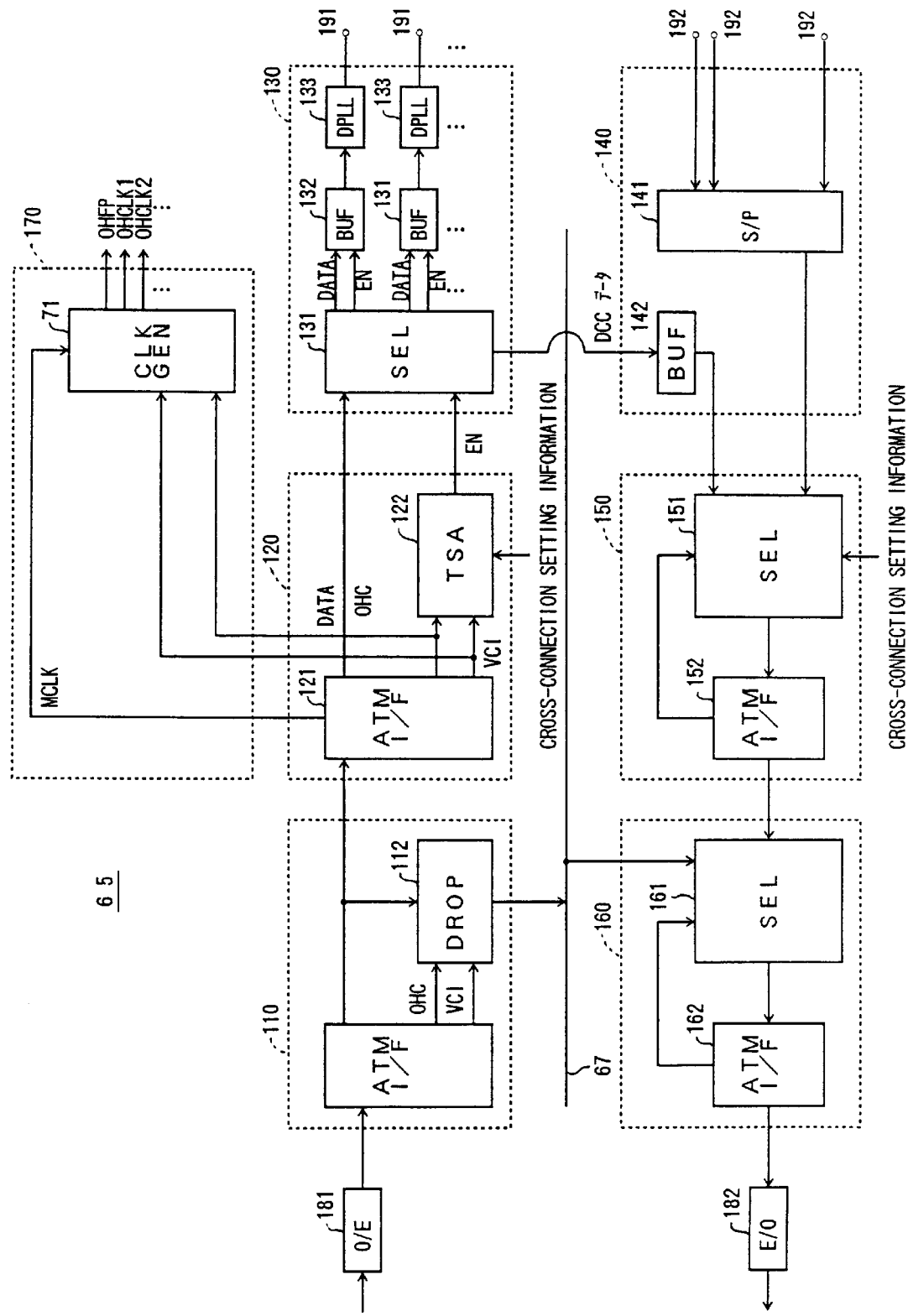
FIG. 14 is a block diagram of an overhead processing part shown in FIG. 9.

FIG. 14 is a block diagram of the overhead processing part 65 shown in FIG. 9. The overhead processing part 65 is made up of a receive system, a transmit system and a timing system. The receive system includes an opto-electric signal converter 181, a first overhead byte drop part 110, a second overhead byte drop part 120 and an output port part 130. The transmit system includes an input port part 140, a first overhead add part 150, a second overhead add part 160, a timing signal generator 170, and an electro-optical signal converter 182 connected to the optical transmission path 69.

The first overhead drop part 100 selects overhead bytes to be processed by the CPU 66 shown in FIG. 9, and outputs these overhead bytes to the CPU bus 67. The first overhead byte drop part 110 includes an ATM interface part (ATM I/F) 111 and a drop part (DROP) 112. The ATM interface part 111 outputs overhead bytes DATA, an overhead count value OHC and the virtual channel identifier VCI. The overhead count value OHC is an output of a counter provided in the interface part 111, and indicates the overhead bytes in the area I of the ATM cell shown in FIG. 12 in which the overhead bytes to be processed by the CPU 66 are stored. The virtual channel identifier VCI indicates to which line the overhead byte of interest belongs and to which channel of the line the above overhead byte belongs. The drop part 112 accepts the overhead byte output by the ATM interface part 111 when the overhead count value OHC indicates any of the byte areas in the area I. Then the drop part 112 outputs the accepted overhead byte to the CPU bus 67 together with the virtual channel identifier VCI.

The second overhead byte drop part 120 drops overhead bytes to be output to the ports, and outputs these overhead bytes to the output port part 130, which includes an ATM interface part (ATM I/F) 121 and a time slot assignment (TSA) part 122. The ATM interface part 111 outputs overhead bytes DATA, an overhead count value OHC and the virtual channel identifier VCI. The overhead count value OHC is an output of a counter provided in the interface part 121, and indicates the overhead bytes in the area II of the ATM cell shown in FIG. 12 in which the overhead bytes to be output to the ports are stored. The virtual channel identifier VCI indicates to which line the overhead byte of interest belongs and to which channel of the line the above overhead byte belongs. The TSA part 122 refers to the virtual channel identifier VCI and cross-connection setting information supplied from the CPU 66 when the overhead count value OHC indicates any of the byte areas in the area II, and outputs an enable signal to the output port part 130. The cross-connection setting information indicates to which line terminator the overhead byte is to be output, which channel should be used to output the above overhead byte, and to which port the above overhead byte is to be output. When the overhead count value OHC and the virtual channel identifier VCI reach the respective specified values, the TSA part 122 outputs a corresponding enable signal EN to the output port part 130. The enable signal EN consists of a plurality of bits, which are respectively assigned the ports via which the overhead bytes should be output. In this case, the enable signal EN consists of bits equal in number to the ports.

The output port part 130 includes a selector (SEL) 131, a plurality of buffers (BUF) 132, and a plurality of DPLL circuits 133 connected to ports 191. The selector 131 receives the overhead bytes from the second overhead drop part 120 and the enable signal EN from the TSA part 122, and outputs the overhead bytes and the enable signal EN to the buffer 132 connected to the port 191 indicated by the enable signal EN. The overhead bytes stored in the buffer 132 are converted into continuous data based on a frequency converting process carried out by the DPLL circuit 133, which will be described later. Then, the continuous data is output to the port 191. The ports 191 can be provided to respective items of the control information formed of overhead bytes, and are common to all the lines (all the line termination parts $61_1$–$61_n$). For example, if specific control information relating to a specific line is needed, the cross-connection setting information to be applied to the TSA part 122 is set so that the above need is met. It is also possible to provide a plurality of groups of lines and provide ports respectively to the groups of lines with respect to one item of the control information.

For example, the ports 191 are used to output the DCC data and speech data, which are not expected to be processed by the CPU 66.

The selector 131 outputs overhead bytes to be relayed or broadcasted, such as the DCC data, to the input port part 140. For this purpose, the output terminals of the selector 131 are connected to the input port part 140 as well as the buffers 132. However, for the sake of simplicity, FIG. 14 is depicted so that the selector 131 has a specific terminal connected to the input port part 140. The selector 131 has a function of converting the parallel signal into the serial signal, and outputs the overhead bytes to the buffers 132 in serial formation.

The input port part 140 includes a serial-to-parallel converter 141 (S/P) and a buffer 142. The S/P converter 141 converts the overhead bytes received via ports 192 in serial formation into parallel data, which is then the first overhead byte add part 150. The buffer 142 temporarily stores the overhead bytes to be relayed or broadcasted from the selector 131, and then outputs these overhead bytes to the first overhead byte add part 150.

The first overhead byte add port 150 includes a selector 151 and an ATM interface part 152. The selector 151 receives the cross-connection setting information from the CPU 66, and selects the overhead bytes to be selected by the cross-connection setting information in accordance with the overhead timing signal (generated every byte) output by the ATM interface part 152. The selected overhead bytes are output to the ATM interface part 152. The ATM interface port 152 puts the received overhead bytes in the area II of the ATM cell shown in FIG. 12.

The second overhead byte add part 160 puts the overhead bytes sent via the CPU bus 67 in the area I of the ATM cell output by the first overhead byte add part 150. The second overhead byte add part 160 includes a selector 161 and an ATM interface part 162. The selector 161 receives the cross-connection setting information from the CPU 66, and selects the overhead bytes on the CPU bus 67 to be selected by the cross-connection setting information in accordance with the overhead timing signal (generated every byte)

output by the ATM interface part 162, so that the selected bytes can be put in the area I of the ATM cell. Then, the ATM cell thus assembled passes through the ATM interface part 162, and is output to the electro-optical signal converter 162.

The timing signal generator 170 generates timing signals necessary to operate the DPLL circuits 133 respectively provided in the output port parts 130, and includes a clock generator 171. The clock generator 171 receives the master clock MCLK, the overhead count value OHC and the virtual path identifier VCI from the ATM interface part 121. Then, the clock generator 171 generates a pulse signal OHFP indicating the leading portion of each overhead, and overhead clock signals OHCLK1, OHCLK2, . . . , which are synchronized with the respective bits of each overhead byte.

Figure 15:
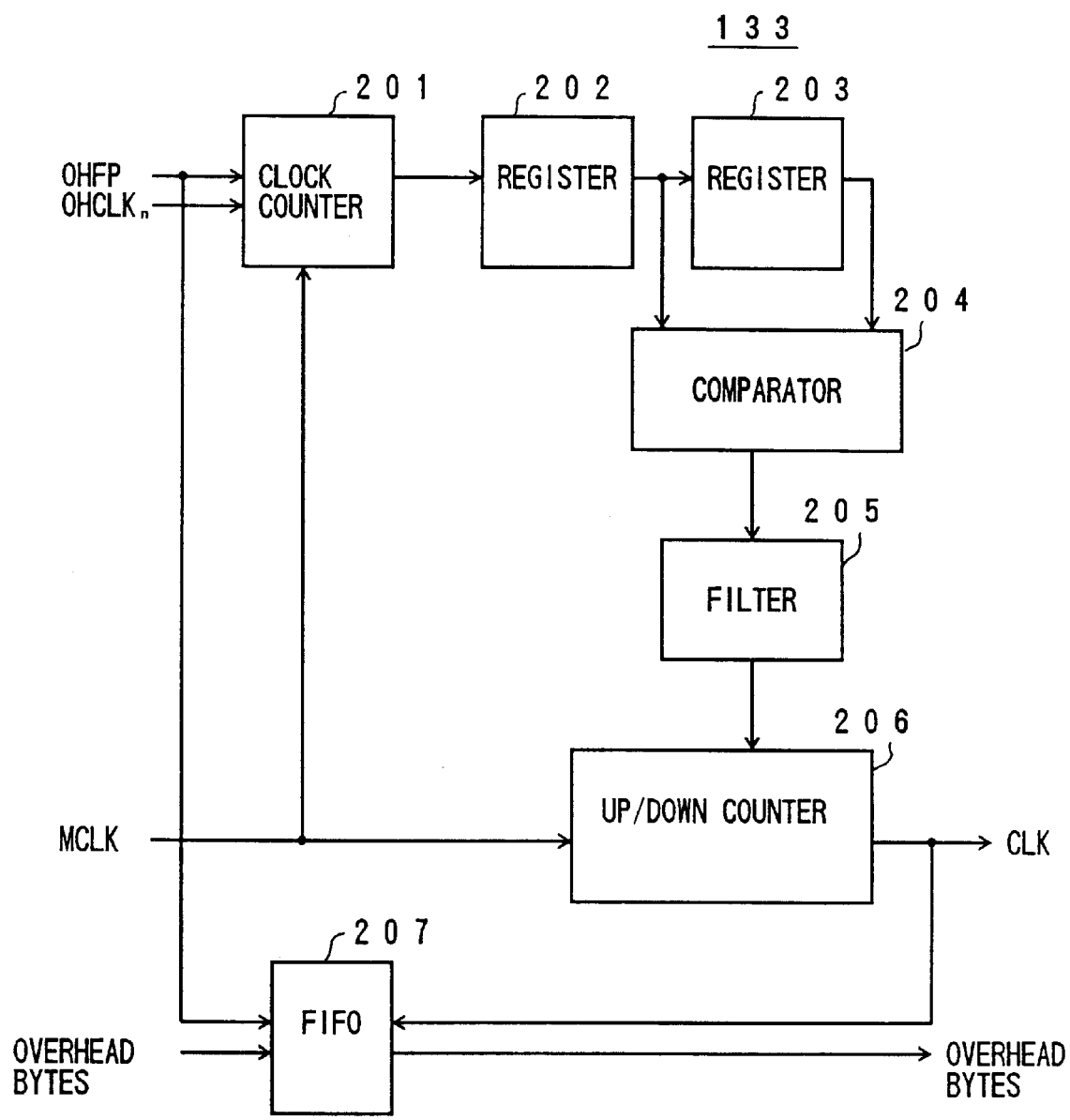
FIG. 15 is a block diagram of a DPLL circuit shown in FIG. 14.

FIG. 15 is a block diagram of each of the DPLL circuit 133. As shown in FIG. 15, the DPLL circuit 133 includes a clock counter 201, registers 202 and 203, a comparator 204, a filter 205, an up/down counter 206, and an FIFO memory 207. The overhead bytes from the buffer 132 are written into the FIFO memory 207 in synchronism with the overhead clock signals LHCLKn (n=1, 2, . . . ). The up/down counter 206 functions as a frequency divider, and outputs the clock signal CLK. In synchronism with the clock signal CLK, the overhead bytes are read from the FIFO memory 207. Hence, a frequency variation which may occur in the lines (optical fiber cables) can be absorbed (compensated for), so that the overhead bytes can be continuous data.

The clock counter 201 repeatedly perform the count operation for each pulse OHFP, and samples, by the master clock MCLK, the period during which the overhead clock signal OHCLK is being supplied. The number of samples thus obtained is serially stored in the registers 202 and 203. The comparator 204 compares the number of samples obtained this time and stored in the register 202 with the previous number of samples stored in the register 203, and obtains the difference therebetween. The difference corresponds to the difference between the positions of consecutive ATM cells. As has been described previously, a jitter of the ATM cells depends on the sequence of sending the ATM cells in addition to the frequency variation (which corresponds to the difference between the lines). The filter 205 is provided to cause the DPLL circuits 133 to follow up only the frequency variation in the lines and not to follow up the cell sending sequence.

More particularly, if the output signal of the comparator 204 (the difference between the current count value and the previous count value) falls within a given range corresponding to a tolerable frequency range, the output signal of the comparator 204 passes through the filter 205 and is output to the up/down counter 206. If the output signal of the comparator 204 is out of the given range, the filter 205 blocks the output signal of the comparator 204. If the output signal of the comparator 204 falls within the given range and the value obtained by subtracting the previous count value from the current count value is a positive value, the output signal of the comparator 204 functions to decrement the count value of the up/down counter 206 by value "1" corresponding to one cycle of the master clock MCLK. If the output signal of the comparator 204 falls within the given range and the value obtained by subtracting the previous count value from the current count value is a negative value, the output signal of the comparator 204 functions to increment the count value of the up/down counter 206 by value "1" corresponding to one cycle of the master clock MCLK. The clock signal CLK thus generated by the up/down counter 206 is applied to the FIFO memory 207 from which the overhead byte is read at the timing defined by the clock signal CLK.

The line frequency variation is detected in the above manner, and the timing at which the overhead byte is read from the FIFO memory 207 is adjusted based on the detected frequency variation. Hence, the overhead bytes read from the FIFO memory 207 can be continuous data.

FIG. 16 is a timing chart for explaining how the DPLL circuit 133 should be designed. It should be noted that FIG. 16 is directed to explaining the design manner and all signals shown therein do not directly correspond to the operation of the DPLL circuit 133.

It will now be assumed that one overhead byte is input every 125 $\mu$s, as shown in part (a) of FIG. 16. For example, the ATM cell generating timing will vary within a maximum range of ±95 $\mu$s. It is required to detect the line frequency variation even if a maximum deviation of the line frequency (equal to ±95 $\mu$s) occurs. Hence, the comparator 204 is operated in synchronism with a pulse signal of 2 kHz (having a cycle of 250 $\mu$s), as shown in part (d) of FIG. 16. Part (c) of FIG. 16 shows 125 $\mu$s intervals synchronized with the pulse signal shown in part (d) of FIG. 16.

Overhead bytes #1, #2 and #3 shown in part (a) of FIG. 16 have frequency variations. The operation of the comparator 204 is carried out every 250 $\mu$s. Under the above condition, if the overhead bytes shown in part (a) of FIG. 16 are indicated by using a pulse signal which changes when two overhead bytes are detected, such a pulse signal indicates the overhead bytes, as shown in part (b) of FIG. 16. A pulse signal shown in part (e) of FIG. 16 indicates the difference between the phase shown in part (b) of FIG. 16 and the phase shown in part (d) thereof, and corresponds to the output of the clock counter 201 shown in FIG. 15. Letters "k", "l", "m" and "n" shown in part (f) of FIG. 16 denote the count values of the clock counter 201.

If the up/down counter 206 is controlled in response to a frequency deviation as large as the maximum deviation equal to ±95 $\mu$s, the count value thereof will be changed greatly, and the continuity of data will be destroyed. The input timing deviation of the DPLL circuits 133 obtained when there is no deviation of the ATM cell generating timing is equal to 40 ppm. Hence, in the case where the overhead byte is input every 125 $\mu$s, the overhead byte will deviate only by 5 ns. Since the comparing operation of the comparator 204 is carried out every 250 $\mu$s, the overhead byte have a deviation of 10 ns. The time 10 ns corresponds to 0.4 if the overhead byte is sampled by a clock signal having a frequency of 38.88 MHz. When taking into account an accumulation of deviation, the up/down counter 206 is controlled when the count value of the clock counter 201 indicates falls within a range of (the previous number of samples)±2. That is, the count value of the up/down counter 206 can be incremented or decremented by 1 every 250 $\mu$s by the master clock MCLK.

In other words, when (the current number of samples)−(the previous number of samples)=+n (n=2 in the above example), the count value of the up/down counter 206 is decremented by 1 only for the next time. When (the current number of samples)−(the previous number of samples)=−n, the count value of the up/down counter 206 is incremented by 1 only for the next time. Hence, if (the current number of samples)−(the previous number of samples) is out of the range of ±n, the difference between the current number of samples and the previous number of samples is discarded, and the count value of the up/down counter 206 is not changed.

In the case shown in FIG. 16, the difference (1−m) or (m−1) is calculated and it is determined whether the difference falls in the range of ±2. Based on the result of the above determination, the count value of the up/down counter 206 is controlled.

In the above manner, the DPLL circuit 133 which follows up only the line frequency variation can be realized.

The present invention is not limited to the above embodiment. For example, a transfer of the overheads is not restricted but can be realized by another asynchronous transfer mode. It is also possible to transfer the overhead bytes by using an electric signal rather than the light signal. It is also possible to configure an overhead processing part which includes the ATM relay/continuity protection part 64 and the overhead processing part 65.

In practice, the ATM processing part 80 can be formed of at least one LSI device. This contributes to down sizing of the transmission device. It is also possible to form the ATM relay/continuity protection part 64 by using at least one LSI device. This also contributes to down sizing. The overhead processing part 65 can be realized by using at least one LSI device.

The present invention is not limited to the specifically disclosed embodiment of the present invention, and various variations and modifications can be made without departing from the scope of the present invention.

What is claimed is:

1. A transmission device which sends and receives signals, including overhead information, over transmission lines, the transmission device comprising:

a first part which adds and drops overhead information every N bytes for each of the transmission lines where N is an integer greater than 2;

a second part which assembles the overhead information concerning the transmission lines dropped by the first part into a first packet and extracts overhead information to be added from a second packet; and a third part which extracts the overhead information from the first packet and assembles the overhead information into the second packet, said third part comprising:

a fourth part that converts data forming the overhead information terminated into continuous data;

a memory that stores the overhead information supplied from the second part; and a digital PLL circuit including a counter generating a read clock applied to the memory from which the overhead information is read, and a controller which controls the counter in accordance with a frequency variation in the overhead information so that the frequency of the read clock is changed based on the frequency variation.

2. The transmission device as claimed in claim 1, wherein the second part includes an asynchronous transfer system in which the overhead information of the signals is transferred to the third part in asynchronism with the signals transferred over the transmission lines.

3. The transmission device as claimed in claim 1, wherein the third part comprises a part which selects overheads which are included in the overhead information and are to be relayed or broadcasted to other transmission devices and which send the overheads back to the second part.

4. The transmission device as claimed in claim 1, wherein the second part transfers the overhead information of the signals to the third part in an asynchronous transfer mode.

5. The transmission device as claimed in claim 4, wherein the second part transfers the overhead information of signals to the second part via an optical transmission path.

6. The transmission device as claimed in claim 1, wherein the second part includes an asynchronous transfer system in which the overhead information of the signals is transferred in multiplexed information to the third part in asynchronism with the signals transferred over the transmission lines.

* * * * *